United States Patent
Kojima et al.

(10) Patent No.: US 10,080,241 B2
(45) Date of Patent: Sep. 18, 2018

(54) RADIO COMMUNICATION METHOD

(71) Applicant: NATIONAL INSTITUTE OF INFORMATION AND COMMUNICATIONS TECHNOLOGY, Koganei-shi, Tokyo (JP)

(72) Inventors: Fumihide Kojima, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 57 days.

(21) Appl. No.: 15/301,293

(22) PCT Filed: Mar. 13, 2015

(86) PCT No.: PCT/JP2015/001416
§ 371 (c)(1),
(2) Date: Sep. 30, 2016

(87) PCT Pub. No.: WO2015/151423
PCT Pub. Date: Oct. 8, 2015

(65) Prior Publication Data
US 2017/0027003 A1 Jan. 26, 2017

(30) Foreign Application Priority Data
Apr. 1, 2014 (JP) .................... 2014-075409

(51) Int. Cl.
*H04W 74/08* (2009.01)
*H04W 28/06* (2009.01)
*H04W 88/02* (2009.01)

(52) U.S. Cl.
CPC ..... *H04W 74/0816* (2013.01); *H04W 28/065* (2013.01); *H04W 88/02* (2013.01)

(58) Field of Classification Search
CPC ... H04W 40/246; H04W 76/02; H04W 84/18; H04W 84/20; H04W 8/005; H04W 8/26;
(Continued)

(56) References Cited

U.S. PATENT DOCUMENTS

2004/0255001 A1* 12/2004 Oh ............... H04W 56/0015
709/209
2006/0205409 A1* 9/2006 Chiou .............. H04W 40/246
455/445

(Continued)

FOREIGN PATENT DOCUMENTS

| JP | 2011077802 A | 4/2011 |
|---|---|---|
| WO | 2007138714 A1 | 12/2007 |
| WO | 2014016877 A1 | 1/2014 |

OTHER PUBLICATIONS

Kojima, et al., "A Study on IEEE 802.15.4e Compliant Low-Power Multi-Hop SUN with Frame Aggregation", Proc. ICC2013, Jun. 2013, pp. 2634-2638.

(Continued)

*Primary Examiner* — Jung Liu
(74) *Attorney, Agent, or Firm* — Holtz, Holtz & Volek PC

(57) ABSTRACT

A radio communication method capable of eliminating a blocking effect caused by a collision of many pieces of data is provided. The radio communication method relaying data from a lower terminal to an upper terminal, includes: a step of determining the number of lower terminals connectable to the upper terminal; a step of connecting the lower terminal and the upper terminal based on the determined connectable number; a step of transmitting a first data from the lower terminal to the upper terminal connected to each other; a step of causing the upper terminal to receive the first data (Continued)

transmitted from the lower terminal; and a step of combining the first data received by the upper terminal and a second data to be transmitted from the upper terminal and creating combined data; and a step causing the upper terminal transmitting the combined data to a further upper terminal.

20 Claims, 5 Drawing Sheets

(58) Field of Classification Search
CPC ..... H04W 12/08; H04W 52/04; H04W 4/008; H04W 12/04; H04W 72/048; Y02D 70/162; Y02D 70/144; Y02D 70/21; H04L 63/1475; H04L 63/062
See application file for complete search history.

(56) References Cited

U.S. PATENT DOCUMENTS

| | | | | |
|---|---|---|---|---|
| 2009/0138617 | A1* | 5/2009 | Veillette | G01D 4/004 709/238 |
| 2009/0154489 | A1* | 6/2009 | Bae | H04L 12/413 370/462 |
| 2014/0064252 | A1* | 3/2014 | Lim | H04W 72/048 370/331 |
| 2014/0315494 | A1* | 10/2014 | Son | A61B 5/0002 455/41.2 |
| 2015/0153175 | A1* | 6/2015 | Skaaksrud | H04W 12/06 701/23 |
| 2015/0215866 | A1* | 7/2015 | Kojima | H04W 52/0216 455/41.2 |
| 2016/0337327 | A1* | 11/2016 | Borean | H04W 84/18 |

OTHER PUBLICATIONS

Kojima, et al., "A Study on IEEE 802.15.4e Compliant Low-Power Multi-Hop SUN with Frame Aggregation", Proc. ICC2013, Jun. 2013.

International Search Report (ISR) and Written Opinion dated Jun. 2, 2015 issued in International Application No. PCT/JP2015/001416.

Japanese Office Action dated May 15, 2018 (and English translation thereof) issued in counterpart Japanese Application No. 2014-075409.

* cited by examiner

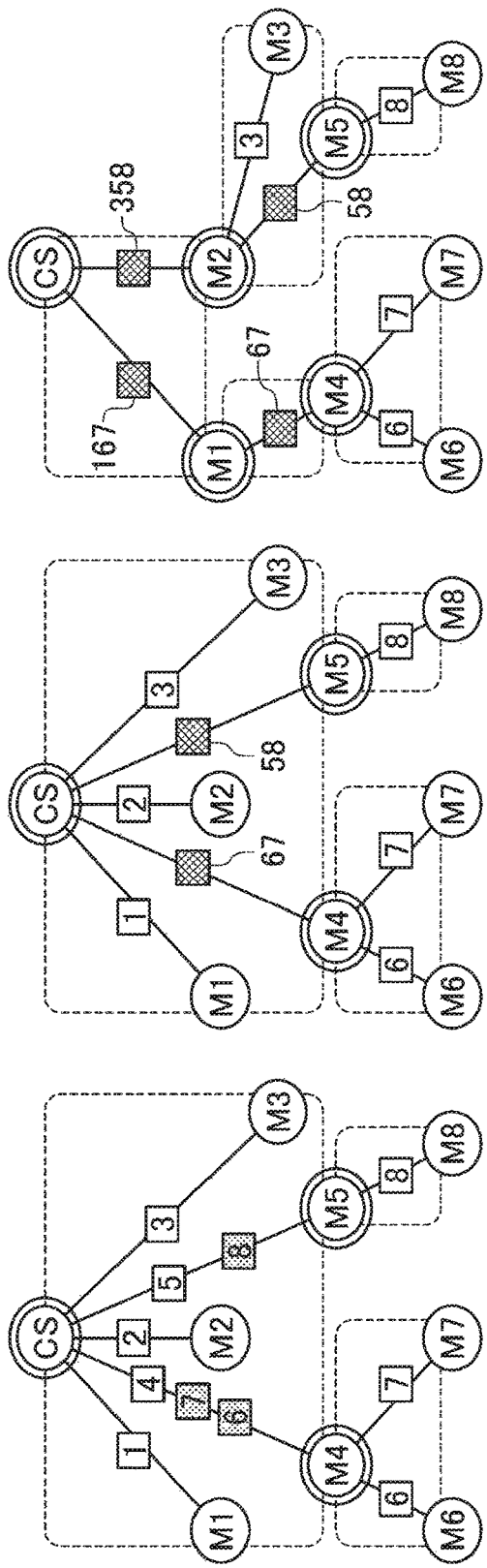

RADIO COMMUNICATION METHOD

TECHNICAL FIELD

The present invention relates to a radio communication method capable of eliminating a blocking effect caused by a collision of many pieces of data in a radio communication system including a plurality of radio terminals.

BACKGROUND ART

In recent years, a small and inexpensive, IEEE 802.15.4 standard-compliant communication device capable of performing low-power digital radio communication is used in a wireless network.

In an IEEE 802.15.4 standard-compliant network, a tree-type topology is adopted which is configured of a CS (collection state), and at least one node.

In a tree-type topology, a lower node relays data to an upper node or the CS while combining pieces of data as necessary.

In such data relaying, since a plurality of pieces of data concentrates on a node which relays data, a data collision occurs, and therefore the success rate of data collection may lower in some cases.

In order to solve such a problem, collision frequency is lowered by combining a plurality of pieces of data to be relayed and thus reducing the number of times that data is transmitted (refer to Non Patent Literature 1).

CITATION LIST

Non Patent Literature

Non Patent Literature 1: Kojima et al. A study on IEEE 802.15.4e Compliant Low-power Multi-Hop SUN with Frame Aggregation, Proc. ICC2013, June 2013.

SUMMARY OF INVENTION

Technical Problem

Blocking at the time of transmission is eliminated by data combination as described above; however, there is a problem that in the case where many nodes relay combined data to the same node or the CS, a collision of pieces of combined data occurs and a blocking effect still occurs.

The present invention is made in view of the above-described problem, and the object of the present invention is to provide a radio communication method capable of suppressing a data collision and effectively preventing occurrence of a blocking effect in an upper terminal on a reception side, as well as in a lower terminal on a transmission side.

Solution to Problem

A radio communication method according to a first invention in a tree-type network including a collection station as a root, includes: a step of determining a maximum number of associations, which is a maximum number of lower terminals that can be associated with each of at least one upper terminal including the collection station; a step of determining a communication channel used for transmission and reception of data between each of the at least one upper terminal and each of the lower terminals; a step of causing the at least one lower terminal to be associated with each of the at least one upper terminal based on the maximum number of associations; a step of causing each of the at least one lower terminal associated with each of the at least one upper terminal to create at least one piece of data and to transmit the at least one piece of data to the each of the at least one upper terminal by using the communication channel; and a step of causing the each of the at least one upper terminal to receive the at least one piece of data transmitted from the at least one lower terminal, and in a case where a further upper terminal than the at least one upper terminal exists, further includes: a step of, in a case where the at least one upper terminal creates the data, combining the data created by the at least one upper terminal and the at least one piece of data received from the at least one lower terminal, and in a case where the at least one upper terminal does not create data, combining the at least one piece of data received from the at least one lower terminal; a step of causing the at least one upper terminal to transmit at least one piece of data including the combined data to the further upper terminal by using the communication channel; and a step of causing the further upper terminal to receive the at least one piece of data transmitted from the at least one upper terminal.

According to a radio communication method according to a second invention, in the first invention, association between each of the at least one upper terminal and the at least one lower terminal is performed by the at least one lower terminal which requests association notifying the each of the at least one upper terminal of an association request, and by the each of the at least one upper terminal authorizing the at least one lower terminal one by one in order of receiving the association request from the at least one lower terminal such that a total number of the at least one lower terminal is equal to or less than the maximum number of associations.

According to a radio communication method according to a third invention, in the first invention, association between each of the at least one upper terminal and the at least one lower terminal is performed by the at least one lower terminal which requests association notifying the each of the at least one upper terminal of an association request, and by the each of the at least one upper terminal authorizing the at least one lower terminal one by one in order of magnitude of transmitted power of the association request such that a total number of the at least one lower terminal is equal to or less than the maximum number of associations.

According to a radio communication method according to a fourth invention, in any one of the first to third inventions, association between each of the at least one upper terminal and each of the at least one lower terminal is performed by the each of the at least one upper terminal regularly notifying the each of the at least one lower terminal of a total number of the lower terminals which can be associated at present, which is a difference between the maximum number of associations and a total number of the lower terminals associated at present, and by the each of the at least one lower terminal which is notified transmitting an association request to the each of the at least one upper terminal in a case where the number of the lower terminals which can be associated at present is greater than or equal to 1.

According to a radio communication method according to a fifth invention, in any one of the first to fourth inventions, the maximum number of associations is determined by setting the maximum number of associations on an upper terminal side in advance.

According to a radio communication method according to a sixth invention, in any one of the first to fourth inventions, the maximum number of associations is determined by each of the at least one lower radio communication terminal notifying each of the at least one upper terminal of a capacity of a first data, and by the each of the at least one upper terminal determining the maximum number of associations such that a total of the notified capacity of the first data is less than or equal to a predetermined threshold.

Advantageous Effects of Invention

According to the present invention configured as described above, it is possible to suppress a data collision and to effectively prevent occurrence of a blocking effect in the upper terminal on the reception side, as well as in the lower terminal on the transmission side.

BRIEF DESCRIPTION OF DRAWINGS

FIGS. 5(a) to 5(c) are schematic views illustrating manners in which the radio communication system according to the embodiment performs the radio communication method according to the present invention. FIG. 5(a) is a schematic view illustrating a manner in which each meter relays data as it is. FIG. 5(b) is a schematic view illustrating a manner in which an upper meter combines pieces of data and relays the data. FIG. 5(c) is a schematic view illustrating a manner in which the number of lower meters which can be associated with an upper meter is limited and pieces of data are combined and relayed.

DESCRIPTION OF EMBODIMENTS

Hereinafter, a radio communication method as an embodiment of the present invention will be described in detail.

Figure 1:
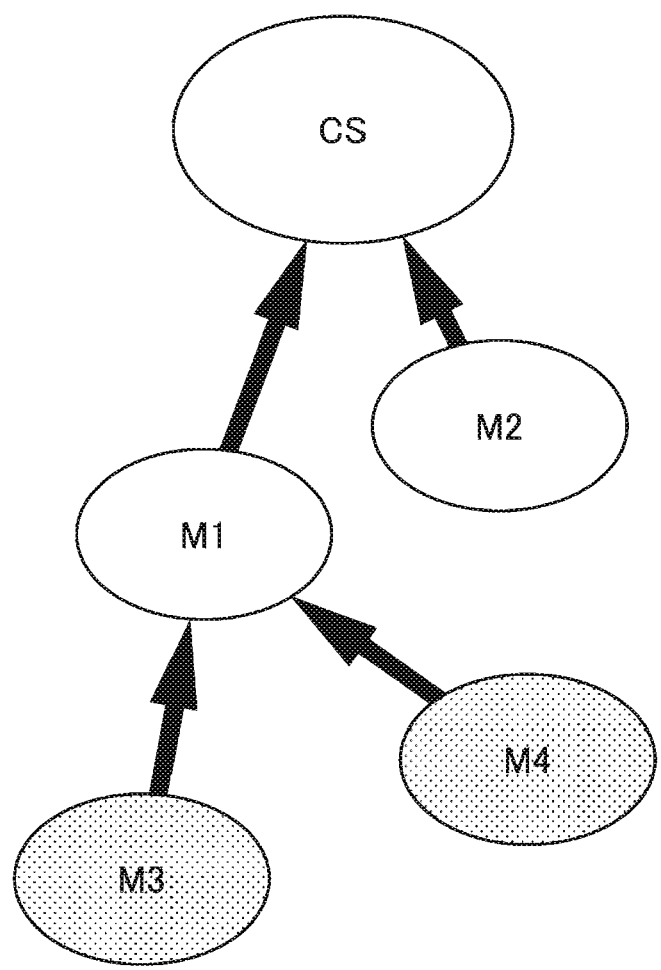
FIG. 1 is a schematic view illustrating an example of a radio communication system to which the present invention is applied.

FIG. 1 is a schematic view illustrating an example of a radio communication system 1 to which the present invention is applied.

The radio communication system 1 is configured by including as radio communication terminals, a collection station CS, and four meters, a meter M1, a meter M2, a meter M3, and a meter M4.

The collection station CS is a top master device, the meters M1 and M2 are slave devices to the collection station CS, and the meters M3 and M4 are slave devices to the meter M1.

Here, an IEEE 802.15.4 standard-compliant network is configured of devices roughly classified into two types, a full function device (FFD) and a reduced function device (RFD).

The FFD corresponds to the collection station CS and the meter M1 according to the present embodiment, and is a full-function device having the function of authorizing a new device intending to join a personal area network (PAN) to which the FFD itself belongs to join the PAN, and the function of defining a superframe and a communication channel (frequency and time) used for communication with another device.

From among such FFDs, the FFD further having the function of determining the ID for the entire network is referred to as a PAN coordinator. There is a single PAN coordinator for each network. In this present embodiment, the collection station CS corresponds to this.

In contrast, the RFD is a device which does not have the above functions which the FFD has, that is, the function of authorizing a device to join the PAN and the function of defining a superframe. The RFD is a reduced-function device which has the same functions as those of the FFD except these functions. In this present embodiment, meters M2, M3, and M4 correspond to this.

Figure 2:
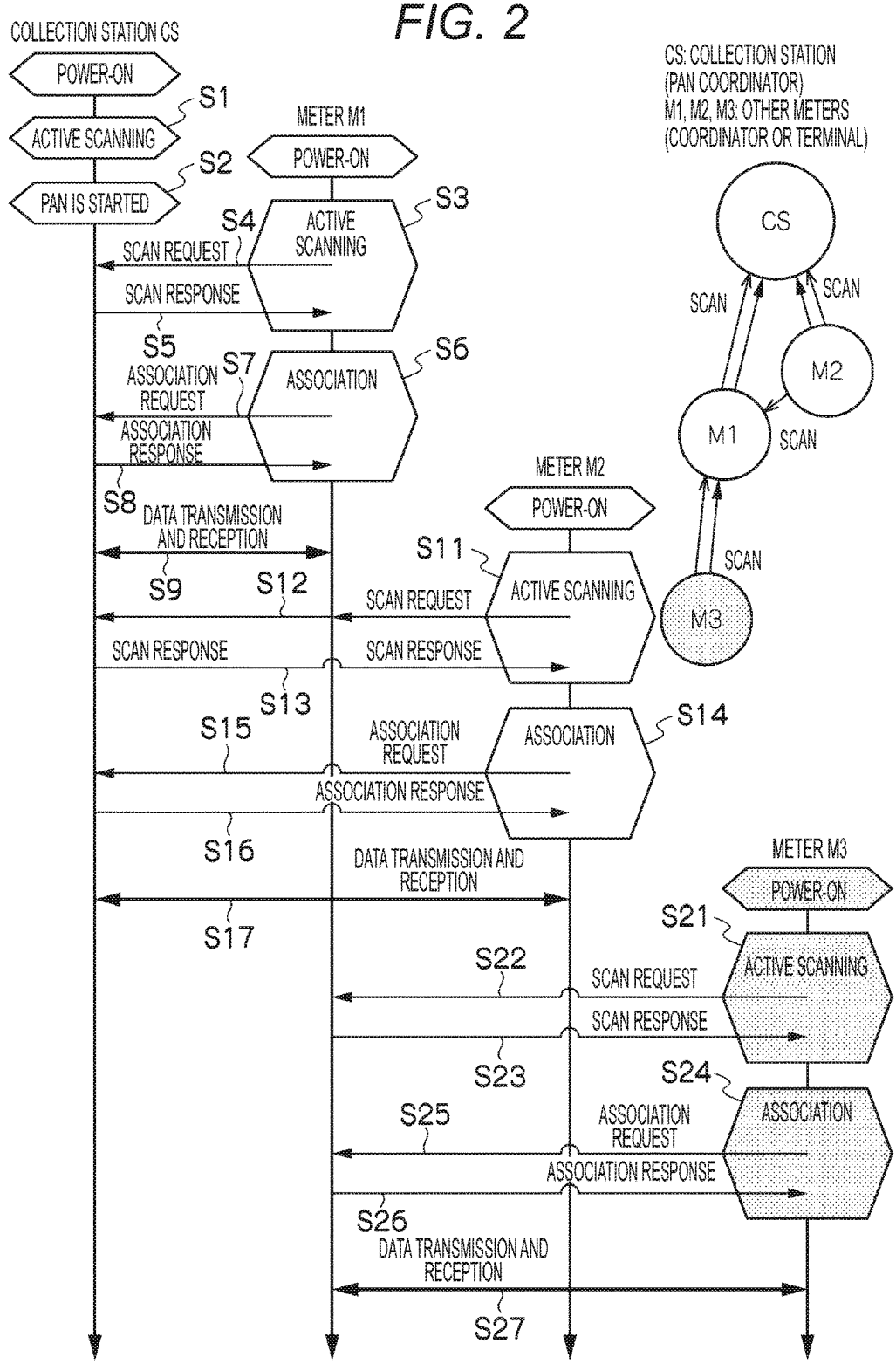
FIG. 2 is a sequence chart illustrating a manner of constructing a network topology in a data transmission and reception method according to an embodiment.

Next, construction of a network topology in this radio communication system 1 will be described. FIG. 2 is a sequence chart illustrating a manner of constructing a network topology in a data transmission and reception method according to the embodiment.

First, the collection station CS is powered on, the collection station CS performs active scanning, and thus the construction of a network topology is initiated (step S1)

Next, the collection station CS defines a PANID and a superframe for itself and creates a PAN (step 52).

Next, the meter M1 is powered on, and the meter M1 performs active scanning (step 53).

In the active scanning performed by the meter M1, first, the meter M1 broadcasts a scan request (step S4).

Then, the collection station CS, which is the FFD existing within a receivable range of the scan request broadcasted from the meter M1, unicasts a response to the received scan request (scan response) to the meter M1 (step S5).

This scan response includes information of the number of meters which can be associated with the collection station CS at present, which is the difference between the association maximum number, which is the maximum number of meters that can be associated with the collection station CS and the number of meters which are associated with the collection station CS at present. The maximum number of associations is set in advance for the collection station CS.

Next, the meter M1 receives this scan response, and then the meter M1 finds the collection station CS. In the case where the number of meters which can be associated with the collection station CS at present is not 0, the meter M1 recognizes that the collection station CS is a device which can be a master device for itself, and active scanning of the meter M1 is terminated.

Next, the meter M1 initiates association with the PAN of the collection station CS (step S6).

In the association of the meter M1, first, the meter M1 unicasts an association request to the collection station CS which can be a master device (step S7).

Next, the collection station CS which has received the association request from the meter M1 compares the maximum number of associations set in advance for itself and the number of meters which are connected to the collection station CS at present, and calculates the number of meters which can be associated at present.

In the case where the number of meters which can be associated at present is greater than or equal to 1, the collection station CS unicasts an association response to the meter M1 (step S8). In the case where the number of meters which can be associated at present is 0, an association response is not transmitted.

In the case where the association response is transmitted, the meter M1 receives this. Then, association of the meter M1 whose master device is the collection station CS to the PAN has been completed.

When association between the collection station CS and the meter M1 has been completed as described above, the collection station CS and the meter M1 can transmit and receive data to and from each other (step S9).

Next, the meter M2 is powered on, and the meter M2 performs active scanning (step S11).

In the active scanning performed by the meter M2, first, the meter M2 broadcasts a scan request (step S12).

Then, when the collection station CS and the meter M1, which are the FFDs existing within a receivable range of the scan request broadcasted from the meter M2, receive the scan request, the collection station CS and the meter M1 unicast a scan response to the meter M2 (step S13).

Also this scan response includes information of the number of meters which can be associated with the collection station CS or the meter M1 at present, which is the difference between the maximum number of associations for the collection station CS or the meter M1 and the number of meters which are associated at present. The maximum number of associations is also set for the meter M1 in advance.

In the case where the meter M2 receives this scan request and the number of meters which can be associated with the collection station CS and the meter M1 at present is not 0, the meter M2 finds the collection station CS and the meter M1 as devices which can be master devices.

In the case where there is a plurality of devices which can be master devices, a device recognizes a device with a higher priority in becoming a master device according to a predetermined standard. In the present embodiment, the meter M2 recognizes according to the predetermined standard that the collection station CS is a device with a higher priority from among the two meters which can be master devices. Thus, active scanning performed by the meter M2 is terminated.

This priority is determined according to a predetermined standard such as the distance to the collection station CS, the distance from a device which transmits a scan request, transmission order of scan requests, or the like. In the present embodiment, priority is determined according to the distance to the collection station CS, and the collection station CS itself is the device with the highest priority. As described, since the priority is determined according to a predetermined standard, it is possible to quickly construct a PAN.

Next, the meter M2 initiates association to the PAN of the collection station CS.

In association of the meter M2, first, the meter M2 unicasts an association request to the collection station CS, which is the device with the above higher priority (step S15).

Next, the collection station CS which has received the association request from the meter M2 compares the maximum number of associations set for the collection station CS itself in advance and the number of meters connected to the collection station CS at present.

Then, in the case where the number of meters which can be associated with the collection station CS at present is greater than or equal to 1, the collection station CS unicasts an association response to the meter M2 (step S16). In the case where the number of meters which can be associated at present is 0, an association response is not transmitted.

In the case where the association response is transmitted, the meter M2 receives this. Then, association of the meter M2 whose master device is the collection station CS to the PAN has been completed.

When association between the collection station CS and the meter M2 has been completed as described above, the collection station CS and the meter M2 can transmit and receive data to and from each other (step S17).

Next, the meter M3 is powered on, and the meter M3 performs active scanning (step S21).

In the active scanning performed by the meter M3, first, the meter M3 broadcasts a scan request (step S22).

Then, when the meter M1 existing within a receivable range of the scan request broadcasted from the meter M3 receives the scan request, the meter M1 unicasts a scan response to the meter M3 (step S23).

Also this scan response includes information of the number of meters which can be associated with the meter M1 at present, which is the difference between the maximum number of associations, which is the maximum number of meters that can be associated with the meter M1 and the number of meters which are associated with the meter M1 at present.

In the case where the meter M3 receives this scan request and the number of meters that can be associated with the meter M1 at present is not 0, the meter M3 finds the meter M1 which is a device that can be a master device, and active scanning performed by the meter M3 is terminated.

Next, the meter M3 initiates association to the PAN of the collection station CS.

In association of the meter M3, first, the meter M3 unicasts an association request to the meter M1 which can be a master device (step S25).

Next, the meter M1 which has received the association request from the meter M3 compares the maximum number of associations set for the meter M1 itself in advance and the number of meters connected to the meter M1 at present.

Then, in the case where the number of meters which can be associated with the meter M1 at present is greater than or equal to 1, the meter M1 unicasts an association response to the meter M3 (step S26). In the case where the number of meters which can be associated with the meter M1 at present is 0, an association response is not transmitted.

In the case where the association response is transmitted, the meter M3 receives the association response. Then, association of the meter M3 whose master device is the meter M1 to the PAN has been completed.

When association between the meter M1 and the meter M3 has been completed as described above, the meter M1 and the meter M3 can transmit and receive data to and from each other. Association between the meter M1 and the meter M4 is performed in the same manner as in the association between the meter M1 and the meter M3.

In the above-described present embodiment, a coordinator, which is an upper terminal, establishes connection with meters, which are lower terminals, one by one in order of arrival, that is, in chronological order of transmission of association requests from the meters until the maximum number of associations is reached.

Figure 3:
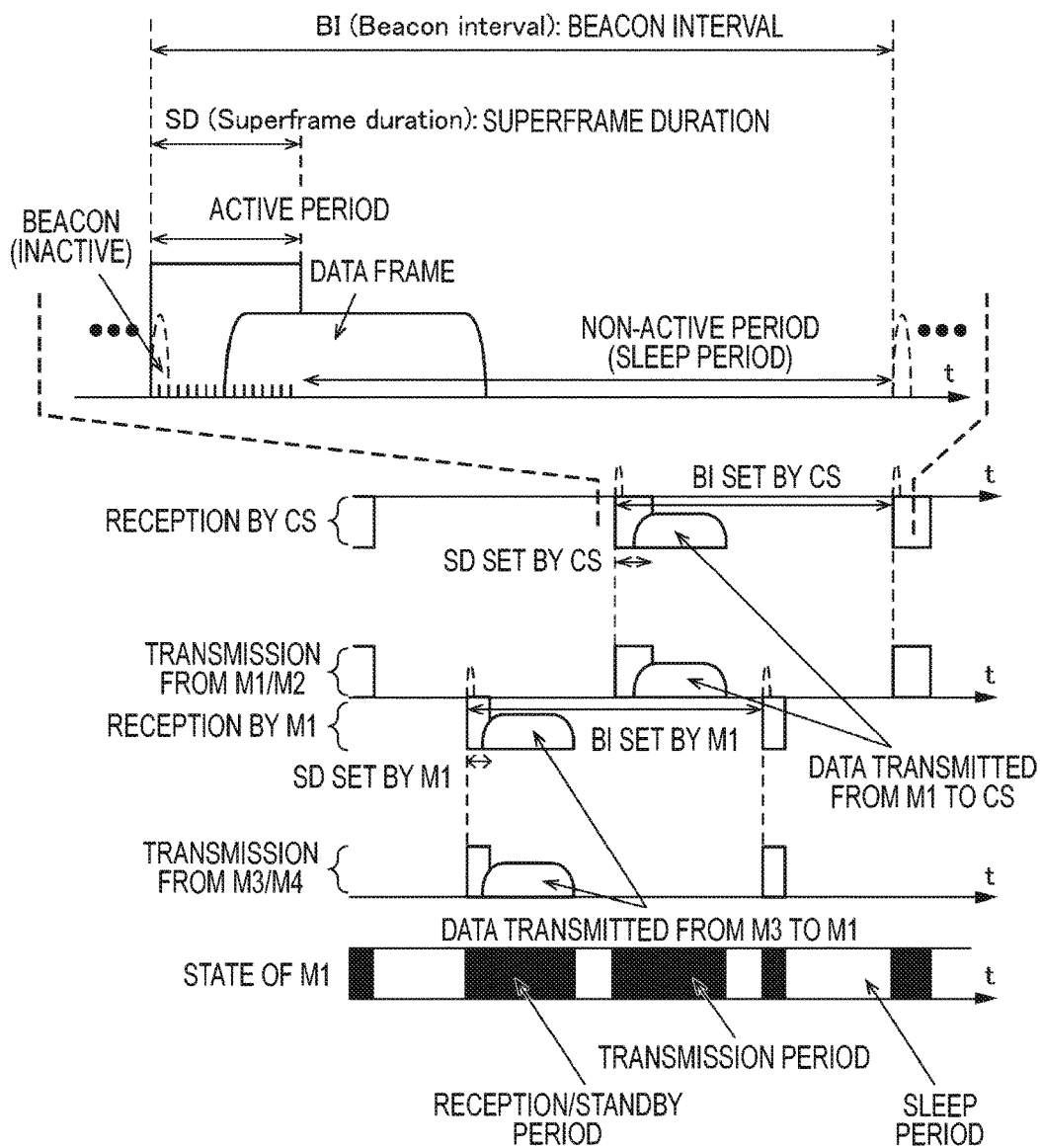
FIG. 3 is a view illustrating a manner of data relaying in the data transmission and reception method according to the embodiment.

Next, an example of data relaying in the data transmission and reception method according to the present embodiment will be described. FIG. 3 is a view illustrating a manner of data relaying in the data transmission and reception method according to the present embodiment.

As illustrated in FIG. 3, in the data transmission and reception method according to the present embodiment, transmission and reception of data between the collection station CS as a master device and the meter M1 or M2 as a slave device to the collection station CS is performed in accordance with a superframe defined by the collection station CS and a communication channel (frequency, time) defined by the collection station CS.

In addition, transmission and reception of data between the meter M1 as a master device and the meter M3 or M4 as a slave device to the meter M1 is performed in accordance with a superframe defined by the meter M1 and a communication channel (frequency, time) defined by the meter M1.

In the above-described transmission and reception of data between the collection station CS and the meter M1 or M2 and the above-described transmission and reception of data between the meter M1 and the meter M3 or M4 as a slave device, an active period is defined as superframe duration (SD), and is configured of a contention access period (CAP) and a contention free access period (CFP).

The CAP is a period during which the master device and all the slave devices that can perform communication are allowed to transmit and receive information to and from each other.

In contrast, the CFP is a period during which only one slave device assigned by the master device is allowed to transmit and receive information. During the CFP, each slave device can transmit and receive information to and from the master device only within a guaranteed time slot (GTS), which is a slot assigned to the slave device itself.

Devices transmit and receive a data frame to and from each other only within the above-described CAP or CFP.

In the data transmission and reception method according to the present embodiment, transmission and reception of a data frame is initiated within the CAP. In contrast, the transmission and reception has not necessarily been completed within the CAP. In the case where transmission and reception of a data frame has not been completed within the CAP, transmission and reception of data continues even after completion of the CAP until the transmission and reception has been completed.

Therefore, since the CAP can be made shorter than that in a conventional data transmission and reception method, the active period can be reduced and a non-active period, that is, the period during which a device can be in a sleep mode can be increased by the reduced amount of time. Thus, power consumption of the device can be effectively suppressed.

In addition, a beacon signal is transmitted from the master device only when synchronization between the master device and the slave device is established according to a beacon interval. After the synchronization is established, transmission of a beacon signal is stopped.

Therefore, power consumption caused by unnecessary transmission and reception of a beacon signal after establishment of synchronization can be effectively suppressed.

Note that transmission of a beacon signal may be resumed as necessary in the case where synchronization is no longer maintained, or the like.

Figure 4:
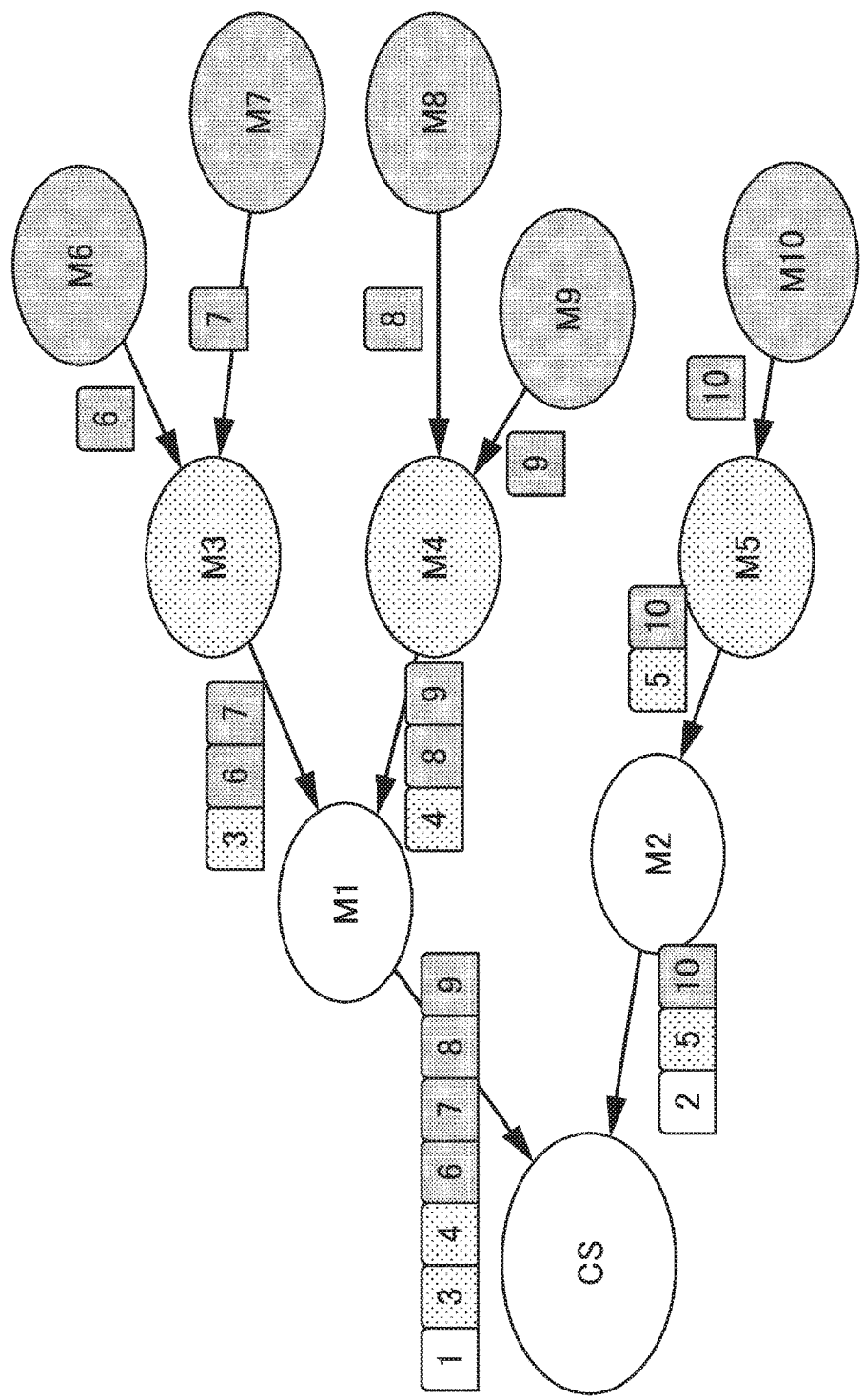
FIG. 4 is a schematic view illustrating a manner of combining pieces of data in the radio communication system according to the embodiment.

Next, data combination performed in the above-described radio communication system 1 will be described. FIG. 4 is a schematic view illustrating a manner of combining pieces of data in a radio communication system 1 according to the present embodiment.

The radio communication system 1 illustrated in FIG. 4 is different from the radio communication system 1 illustrated in FIG. 1 in that it is configured of a collection station CS and 10 meters, meters M1 to M10. A piece of data created and transmitted by each of the meters M1 to M10 is denoted by the same number as that of the meter which creates and transmits the piece of data. That is, pieces of data are referred to as data 1 to 10.

In the data transmission and reception method according to the present embodiment, every time data is sequentially relayed and collected from the lowest meter to the collection station CS in the data transmission and reception method according to the above-described first embodiment, a sync part and a header part are newly created and payload from each meter is combined with the data.

Therefore, the size of redundant parts such as the sync part and the header part can be reduced, and the time required for data transmission and reception can be reduced.

In addition, by reducing the time required for data transmission and reception, the device which transmits and receives data after completion of the CAP can be put into a sleep mode in a shorter time. Therefore, power consumption can be suppressed.

Next, the manner in which the above-described radio communication system 1 performs the radio communication method according to the present invention will be described.

FIGS. 5(a) to 5(c) are schematic views illustrating manners in which the radio communication system 1 according to the present embodiment performs the radio communication method according to the present invention. FIG. 5(a) is a schematic view illustrating a manner in which each meter relays data as it is. FIG. 5(b) is a schematic view illustrating a manner in which an upper meter combines pieces of data and relays the data. FIG. 5(c) is a schematic view illustrating a manner in which the number of lower meters which can be associated with an upper meter is limited and pieces of data are combined and relayed.

In the state illustrated in FIG. 5(a), many pieces of data 1, 2, 3, 4, 5, 6, and 7 are transmitted at the same time to the collection station CS. These pieces of data collide with each other, and a blocking effect occurs.

In addition, in the state illustrated in FIG. 5(b), by combining pieces of data transmitted from lower meters at an upper meter, the number of times that data is transmitted is reduced; however, a blocking effect still occurs when the collection station CS receives data.

Therefore, in the present invention, as illustrated in FIG. 5(c), control is performed so that the maximum number of associations of lower meters which can be associated with the collection station CS or an upper mater which serves as a coordinator is limited to a predetermined number or less. In the example of FIG. 5(c), the maximum number of associations is set to 2.

Therefore, only two meters can be connected to the collection station CS. In FIG. 5(c), two meters, the meters M1 and M2, are connected.

In addition, from among the meters which serve as coordinators and to which a plurality of meters is connected, only one meter, the meter M4, is connected to the meter M1, only two meters, the meters M3 and M5, are connected to the meter M2, and only two meters, the meters M6 and M7, are connected to the meter M4.

Furthermore, as illustrated in FIG. 5(c), pieces of data transmitted from lower meters are combined at an upper coordinator. Thus, the number of pieces of data that an upper meter simultaneously receives can be reduced.

As described above, since an upper coordinator combines pieces of data transmitted from lower meters and relays the combined data and the number of lower meters which can be connected to the coordinator is limited, a data collision can be suppressed and occurrence of a blocking effect can be effectively prevented in an upper terminal on a reception side as well as in a lower terminal on a transmission side.

Note that in the above-described embodiment, a coordinator and lower meters are connected in chronological order of transmission of association requests from the meters.

However, the present invention is not limited to this, and connection is performed in order of magnitude of transmitted power of the association requests until an association possible number is reached.

In the above-described embodiment, the maximum number of associations is set in advance on the side of a coordinator which is an upper terminal.

However, the present invention is not limited to this. The maximum number of associations may be determined as follows. A lower meter notifies an upper coordinator of the capacity of data to be transmitted from itself, and the coordinator determines the maximum number of associations so that the total capacity of data notified by the respective lower meters becomes less than or equal to a predetermined threshold.

In addition, an aspect may be adopted where in the above-described radio communication system 1, in the case where each mater which relays data does not create data by itself, each meter combines at least one piece of data received from lower meters and transmits the data to an upper meter. In addition, the number of pieces of data that each meter creates and transmits at a time is not limited to 1 but may be 2 or greater.

REFERENCE SIGNS LIST

1: radio communication system
CS: collection station
M1, M2, M3, M4: meter
M5, M6, M7, M8: meter
FIG. 2
COLLECTION STATION CS
METER M1
METER M2
METER M3
(PAN COORDINATOR)
M1, M2, M3: OTHER METERS
(COORDINATOR OR TERMINAL)
SCAN
POWER-ON
S1 ACTIVE SCANNING
S2 PAN IS STARTED
S3 ACTIVE SCANNING
S4 SCAN REQUEST
S5 SCAN RESPONSE
S6 ASSOCIATION
S7 ASSOCIATION REQUEST
S8 ASSOCIATION RESPONSE
S9 DATA TRANSMISSION AND RECEPTION
S11 ACTIVE SCANNING
S12 SCAN REQUEST
S13 SCAN RESPONSE
S14 ASSOCIATION
S15 ASSOCIATION REQUEST
S16 ASSOCIATION RESPONSE
S17 DATA TRANSMISSION AND RECEPTION
S21 ACTIVE SCANNING
S22 SCAN REQUEST
S23 SCAN RESPONSE
S24 ASSOCIATION
S25 ASSOCIATION REQUEST
S26 ASSOCIATION RESPONSE
S27 DATA TRANSMISSION AND RECEPTION
FIG. 3
BEACON INTERVAL
SUPERFRAME DURATION
BEACON (INACTIVE)
ACTIVE PERIOD
DATA FRAME
NON-ACTIVE PERIOD (SLEEP PERIOD)
RECEPTION BY CS
BI SET BY CS
DATA TRANSMITTED FROM M1 TO CS
SD SET BY CS
TRANSMISSION FROM M1/M2
RECEPTION BY M1
BI SET BY M1
DATA TRANSMITTED FROM M3 TO M1
SD SET BY M1
TRANSMISSION FROM M3/M4
STATE OF M1
RECEPTION/STANDBY PERIOD
TRANSMISSION PERIOD
SLEEP PERIOD
FIG. 5
COLLECTION STATION
NODE
COORDINATOR
LINKS SHARING SUPERFRAME
NORMAL FRAME
RELAYED FRAME
COMBINED FRAME

The invention claimed is:

1. A radio communication method in a tree-type network including at least one lower terminal and at least one upper terminal, wherein the at least one upper terminal includes a collection station as a root of the tree-type network, the root being a highest level of the tree-type network, the method comprising:

determining a maximum number of associations, which is a maximum number of lower terminals that can be associated with each respective at least one upper terminal, including the collection station;

determining a communication channel used for transmission and reception of data between the at least one upper terminal and the at least one lower terminal;

causing the at least one lower terminal to be associated with the at least one upper terminal based on the maximum number of associations;

causing the at least one lower terminal associated with the at least one upper terminal to create at least one piece of data and to transmit the at least one piece of data to the at least one upper terminal by using the communication channel; and causing the at least one upper terminal to receive the at least one piece of data transmitted from the at least one lower terminal, and wherein, in a case in which the at least one upper terminal includes a higher-level upper terminal and at least one lower-level upper terminal, the at least one lower-level upper terminal is connected to the higher-level upper terminal and to the at least one lower terminal, and the at least one lower terminal is connected only to the at least one lower-level upper terminal and not to the higher-level upper terminal, whereby the at least one lower-level upper terminal is interposed between the higher-level upper terminal and the at least one lower terminal within the tree-type network, and the method further comprises:

in a case in which the at least one lower-level upper terminal creates the data, combining the data created by the at least one lower-level upper terminal and the at least one piece of data received from the at least one lower terminal, and in a case in which the at least one lower-level upper terminal does not create data, combining the at least one piece of data received from the at least one lower terminal;

causing the at least one lower-level upper terminal to transmit at least one piece of data including the combined data to the higher-level upper terminal by using the communication channel; and causing the higher-level upper terminal to receive the at least one piece of data transmitted from the at least one lower-level upper terminal.

2. The radio communication method according to claim 1, wherein association between the at least one upper terminal and the at least one lower terminal is performed by the at least one lower terminal which requests association notifying the at least one upper terminal of an association request, and by the at least one upper terminal authorizing the at least one lower terminal one by one in order of distance from the at least one lower terminal which transmits the association request such that a total number of the at least one lower terminal associated per upper terminal is equal to or less than the maximum number of associations.

3. The radio communication method according to claim 2, wherein association between the at least one upper terminal and the at least one lower terminal is performed by the at least one upper terminal regularly notifying the at least one lower terminal of a total number of the lower terminals which can be associated at present, which is a difference between the maximum number of associations and a total number of the lower terminals associated at present, and by the at least one lower terminal which is notified transmitting an association request to the at least one upper terminal in a case where the number of the lower terminals which can be associated at present is greater than or equal to 1.

4. The radio communication method according to claim 2, wherein the maximum number of associations is determined by setting the maximum number of associations on an upper terminal side in advance.

5. The radio communication method according to claim 3, wherein the maximum number of associations is determined by setting the maximum number of associations on an upper terminal side in advance.

6. The radio communication method according to claim 1, wherein association between the at least one upper terminal and the at least one lower terminal is performed by the at least one lower terminal which requests association notifying the at least one upper terminal of an association request, and by the at least one upper terminal authorizing the at least one lower terminal one by one in order of magnitude of transmitted power of the association request such that a total number of the at least one lower terminal associated per upper terminal is equal to or less than the maximum number of associations.

7. The radio communication method according to claim 2, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

8. The radio communication method according to claim 3, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

9. The radio communication method according to claim 4, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

10. The radio communication method according to claim 6, wherein association between the at least one upper terminal and the at least one lower terminal is performed by the at least one upper terminal regularly notifying the at least one lower terminal of a total number of the lower terminals which can be associated at present, which is a difference between the maximum number of associations and a total number of the lower terminals associated at present, and by the at least one lower terminal which is notified transmitting an association request to the at least one upper terminal in a case where the number of the lower terminals which can be associated at present is greater than or equal to 1.

11. The radio communication method according to claim 10, wherein the maximum number of associations is determined by setting the maximum number of associations on an upper terminal side in advance.

12. The radio communication method according to claim 6, wherein the maximum number of associations is determined by setting the maximum number of associations on an upper terminal side in advance.

13. The radio communication method according to claim 6, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

14. The radio communication method according to claim 10, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

15. The radio communication method according to claim 12, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

16. The radio communication method according to claim 1, wherein association between the at least one upper terminal and the at least one lower terminal is performed by the at least one upper terminal regularly notifying the at least one lower terminal of a total number of the lower terminals which can be associated at present, which is a difference between the maximum number of associations and a total number of the lower terminals associated at present, and by the at least one lower terminal which is notified transmitting an association request to the at least one upper terminal in a case where the number of the lower terminals which can be associated at present is greater than or equal to 1.

17. The radio communication method according to claim 16, wherein the maximum number of associations is determined by setting the maximum number of associations on an upper terminal side in advance.

18. The radio communication method according to claim 16, wherein the maximum number of associations is determined by the at least one lower terminal notifying the at least one upper terminal of a capacity of a first data, and by the at least one upper terminal determining the maximum number of associations such that a total of the notified capacity of the first data from each respective at least one lower terminal is less than or equal to a predetermined threshold.

19. The radio communication method according to claim 1, wherein the maximum number of associations is determined by setting the maximum number of associations on an upper terminal side in advance.

20. The radio communication method according to claim 1, wherein the maximum number of associations is determined by the at least one lower terminal notifying the at least one upper terminal of a capacity of a first data, and by the at least one upper terminal determining the maximum number of associations such that a total of the notified capacity of the first data received from each respective at least one lower terminal is less than or equal to a predetermined threshold.

* * * * *